Jan. 27, 1942. J. L. L. A. A. MOULET 2,271,303
SHAFT LUBRICATING AND SEALING MEANS
Filed May 17, 1940

Jean Louis Léon Alexandre Albert Moulet
INVENTOR his ATTY.

Patented Jan. 27, 1942

2,271,303

UNITED STATES PATENT OFFICE 2,271,303

SHAFT LUBRICATING AND SEALING MEANS

Jean Louis Léon Alexandre Albert Moulet, Paris, France, assignor to Martin Moulet & Cie, Oullins, Rhone, France, a company of France Application May 17, 1940, Serial No. 335,711
In France June 6, 1939

3 Claims. (Cl. 308—36.2)

The lubrication of shafts or like rotatable parts, whether revolving or oscillating, in machines, is usually ensured by an injection under pressure, or by a circulation by gravity, of a lubricant which is contained in suitable channels and which proceeds into the interstices between the friction surfaces.

Such lubrication becomes defective in certain cases, for instance in pumps and compressors, owing to the counter-pressure of a fluid contained in the machine and tending to flow to the exterior, by means of the interstitial play, along the bearing portions of the movable shaft. These conditions are attended with the double drawback of risks of leakage and of seizing.

The present invention has for its object a device providing at the same time for the lubrication and the fluid-tightness of the bearing surfaces of a shaft or like rotatable part. The said device is chiefly characterized by the fact that it comprises an expansible packing piece which is so arranged as to automatically permit the introduction of the lubricant by the effect of the pressure of injection of the said lubricant, and that it ensures the fluid-tightness by returning to its seating by the effect of its own expansion, and possibly by the effect of the pressure which prevails in the machine and may be imparted to the lubricant.

The said expansible packing piece is preferably completed by a second packing piece which is applied in an elastic manner upon the rotatable part and forms a second stage of fluid-tightness, thus preventing all leakage of lubricant, either by the effect of the pressure prevailing in the casing, or by the effect of the excess pressure during the injection of the lubricant.

By the effect of these two stages of fluid-tightness, the packing which would be provided between the fluid under pressure and the exterior, is replaced by a packing between the lubricant (a liquid of great viscosity) and the exterior, and thus the device has a great efficacity.

The invention further relates to pumps, compressors and like apparatus comprising one or more shafts or other rotatable parts provided with lubricating and fluid-tight devices comprising one or more of the above-mentioned features.

In the accompanying drawing, which is given solely by way of example:

Figure 1:
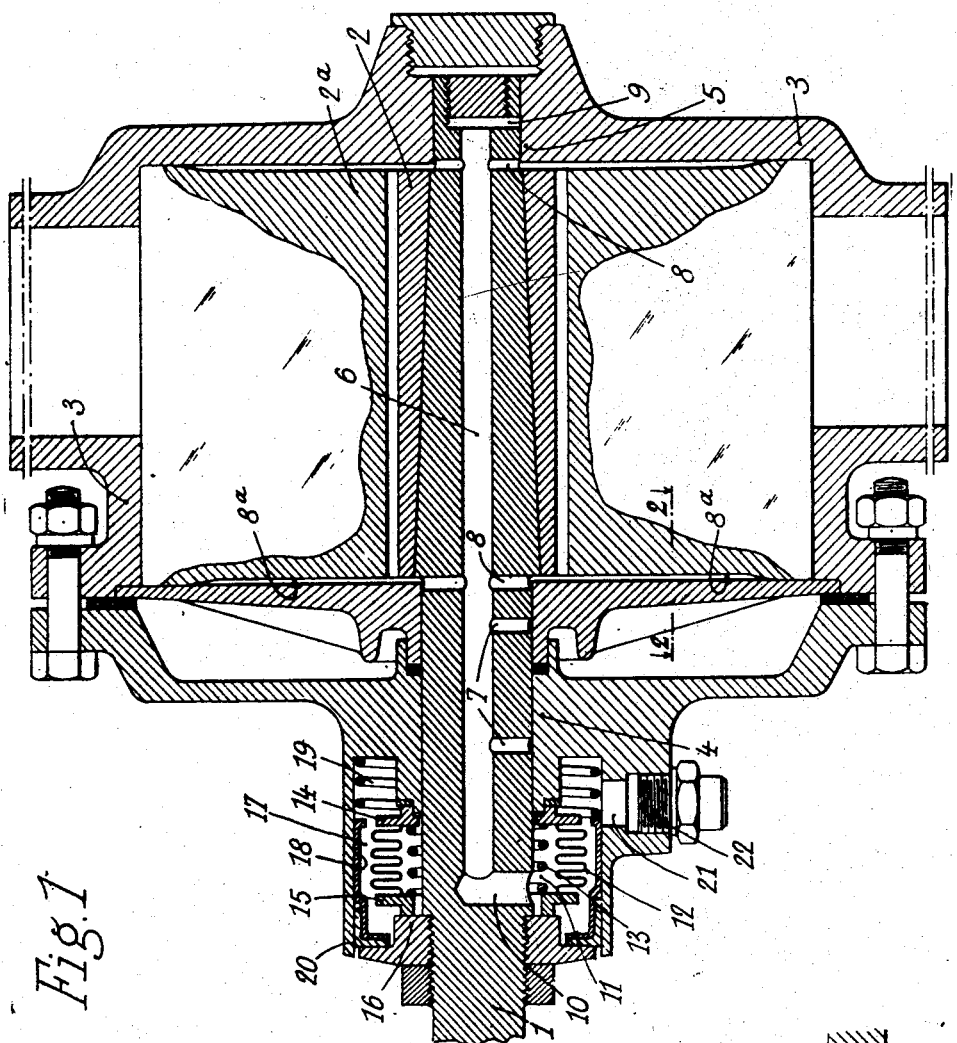
Fig. 1 is a longitudinal section of a hand-operated pump of the semi-rotary type, having plates provided with a device for lubrication and fluid-tightness according to the invention, shown in the normal closed position.
Figure 2:
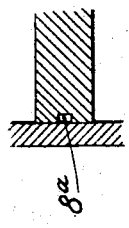
Fig. 2 is a partial section on the line 2—2 of Fig. 1.

In the present embodiment, the shaft 1 carrying for instance a rotor with plates 2ª or the like, contained in a casing 3, is mounted in the known manner in bearings 4 and 5. It is pierced with a channel 6 which is preferably axial, whose ends are closed up, but which communicates with the various friction surfaces through radial orifices such as 7, 8 and 9, provided in sufficient number. The orifices 8 are extended for instance by grooves 8a formed in the rotor 2.

A radial orifice 10 serves for the admission of the lubricant, and it makes connection between the channel 6 and a chamber 11 situated at the exterior of the shaft 1. The said chamber 11 is formed by an expansible sleeve or diaphragm 12 which contains a spring 13 and is closed at each end by annular discs 14 and 15. The disc 14 is mounted on a shoulder of the bearing 4. The disc 15 is applied by a spring 13 against an annular member 16 which is mounted on the shaft 1. A certain play is provided between the disc 15 and the shaft 1.

The expansible diaphragm 12 is situated in a chamber 17 which is formed in the body of the bearing 4. In this chamber 17, a socket 18 is slidable, after the manner of a piston, between a spring 19 which bears upon the end of the chamber 17, and a flexible packing piece 20 which may consist of pressed leather and is in contact with a shoulder on the rotatable member 16 which is mounted on the shaft.

The chamber 17 communicates with the exterior through a conduit 21 which is adapted to receive a lubricating plug of the known type or a suitable tube for the injection of lubricant, and in this case the said conduit is closed, except during the time of injection of the lubricant, by a plug 22 or the like. The injection conduit may be provided with a valve which opens from the outside to the inside of the chamber 17.

The operation is a follows. When the conduit 21 shown in Fig. 1 is connected with a pipe for the supply of lubricant under pressure, this lubricant will flow in the chamber 17, exerting a certain pressure upon its walls. Owing to this pressure, the slidable socket 18 which is also driven in the same direction by the expansion of the spring 19, will apply with an increased force, against the annular shoulder 16, the pressed packing piece 20, which thus prevents all leakage of the lubricant. Moreover, owing to the effect of the pressure of the lubricant, the elastic diaphragm 12 will contract, thus compressing the spring 13.

When the annular disc 15 has receded from the member 16, the lubricant will flow around the shaft 1, will enter into the channel 6 and will then be distributed upon the various friction surfaces of the said shaft 1 and of the bearings 4 and 5, through the transverse orifices 7, 8 and 9. In this way, the lubrication of these friction parts is assured.

When the lubricant ceases to be admitted through the conduit 21, the pressure will no longer be exerted upon the walls of the chamber 17 nor upon the elastic diaphragm 12, and this latter, owing to the expansion of the spring 13, will expand, and the annular disc 15 will be applied upon the member 16 on the shaft 1, thus preventing all leakage to the exterior, either of the injected lubricant or of the fluid contained in the chamber 3.

In these conditions, the fluid-tightness is well assured.

It will be noted that the injected lubricant, which is usually a viscous liquid, is contained between two adjacent parts (15, 16) and (20, 16), thus forming a hydraulic packing of great efficacity between the fluid contained in the casing and the exterior, while the pressure of this fluid tends to apply the adjacent surfaces upon one another.

If in any case the part 15, 16 should become damaged, the fluid contained in the casing, which may be a gas or a liquid of low viscosity, can escape to the exterior only after it has obliged the lubricant in the chamber 17 to escape to the exterior. However this lubricant has a great viscosity, and it can be readily maintained by the flexible packing piece 20, and especially since this piece is subjected to the pressure of the fluid, which pressure is transmitted by the lubricant. Thus the present device will afford the best fluid-tight conditions.

Obviously, the invention is not limited to the embodiment herein described and represented, which is given solely by way of example.

A given shaft or rotatable part may be provided with several devices of the aforesaid type. A mechanism may comprise several shafts having such devices.

The invention may be applied to any mechanism comprising a shaft which passes through the wall of a casing containing a fluid which is optionally under pressure.

Having now described my invention what I claim as new and desire to secure by Letters Patent is:

1. A lubricating and fluid-tight device for shafts and rotatable elements comprising in combination a stationary member provided with a cylindrical bore in which said rotatable element is adapted to be rotatably supported, an annular member secured to and rotatable with said element, one of said members being provided with an inner cylindrical surface extending to close proximity of the other member so as to form about said element an annular hollow space and one of said members being provided with a bearing surface at right angles to the axis of said element, spring pressed packing means applied on both sides of the joint between the adjacent parts of said cylindrical surface of one member and said other member, connecting means provided on said stationary member and adapted to connect said hollow space with lubricant supplying means, an axially collapsible and extensible container disposed about said element in said hollow space and provided with an end face adapted to bear in a fluid-tight manner on said bearing surface provided on said one member and secured in a fluid-tight manner to the other of said members, said container being adapted to collapse and to bring said end face away from said bearing surface when subjected to a compressed fluid on its outer side and to expand and to bring said end face against said bearing surface when subjected to a compressed fluid on its inner side, and spring means urging said end face against said bearing surface, whereby lubricant may be introduced in said container when pressure is exerted on the lubricant in said connecting means and may be retained in a fluid tight manner in said container when no pressure is exerted on said lubricant in said connecting means.

2. A lubricating and fluid-tight device according to claim 1, in which said spring pressed packing means comprises a ring slidable on said cylindrical surface of one member and spring means urging said ring against the other member.

3. A lubricating and fluid-tight device for shafts and rotatable elements comprising in combination a stationary member provided with a cylindrical bore in which said rotatable element is adapted to be rotatably supported, an annular member secured to and rotatable with said element, one of said members being provided with an inner cylindrical surface extending to close proximity of the other member so as to form about said element an annular hollow space and one of said members being provided with a bearing surface at right angles to the axis of said element, packing means disposed within said hollow space and adapted to be applied to the joint between the adjacent parts of the cylindrical surface of one member and said other member by the pressure of a lubricant fluid in said hollow space, connecting means on said stationary member to connect said hollow space with lubricant supplying means, an axially collapsible and extensible container disposed about said element in said hollow space and provided with an end face adapted to bear in a fluid-tight manner on said bearing surface provided on said one member and secured in a fluid-tight manner to the other of said members, said container being adapted to collapse and to bring said end face away from said bearing surface when subjected to a compressed fluid on its outer side and to expand and to bring said end face against said bearing surface when subjected to a compressed fluid on its inner side, and spring means urging said end face against said bearing surface, whereby lubricant may be introduced into said container when pressure is exerted on the lubricant in said connecting means and may be retained in a fluid-tight manner in said container when no pressure is exerted on said lubricant in said connecting means.

JEAN LOUIS LÉON ALEXANDRE
ALBERT MOULET.